(12) United States Patent
l'Anson

(10) Patent No.: US 8,243,718 B2
(45) Date of Patent: Aug. 14, 2012

(54) COMMUNICATIONS SYSTEM AND GATEWAY

(75) Inventor: Colin l'Anson, Ottery St. Mary (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 980 days.

(21) Appl. No.: 12/087,781

(22) PCT Filed: Jan. 3, 2007

(86) PCT No.: PCT/EP2007/050025
§ 371 (c)(1),
(2), (4) Date: Sep. 29, 2008

(87) PCT Pub. No.: WO2007/085507
PCT Pub. Date: Aug. 2, 2007

(65) Prior Publication Data
US 2009/0180603 A1    Jul. 16, 2009

(30) Foreign Application Priority Data

Jan. 30, 2006    (GB) ................................. 0601804.8

(51) Int. Cl.
*H04L 12/66*    (2006.01)

(52) U.S. Cl. ...................... 370/352; 370/401; 379/88.19
(58) Field of Classification Search ............... 455/414.1; 370/353
See application file for complete search history.

(56) References Cited

U.S. PATENT DOCUMENTS

| 7,200,417 B2 * | 4/2007 | Belkin et al. ............... 455/552.1 |
| 7,388,854 B2 * | 6/2008 | Lee et al. ...................... 370/338 |
| 2006/0109783 A1 * | 5/2006 | Schoeneberger et al. ..... 370/217 |
| 2006/0222157 A1 * | 10/2006 | Kanerva et al. .......... 379/211.01 |
| 2010/0157983 A1 * | 6/2010 | Mussman et al. ............. 370/352 |

FOREIGN PATENT DOCUMENTS

| WO | WO-01/65813 | 9/2001 |
| WO | WO-03/007178 | 1/2003 |

OTHER PUBLICATIONS

Srivastava et al., "Preventing Spam For SIP-Based Instant Messages and Sessions," Internet Citation Online, Oct. 28, 2004, Retrieved From the Internet: URL:http://www.cs.columbia.edu/techreports/cucs-042-04.pdf>, 16 Sheets.

* cited by examiner

*Primary Examiner* — Creighton Smith

(57) ABSTRACT

According to one aspect of the present invention, there is provided a method, in a communication gateway, of forwarding a call establishment request from a caller of a first network to a subscriber of a second network, comprising: receiving from a caller a call establishment request intended for a subscriber; obtaining the identities of the caller and the subscriber, the identities being in a format of the first network; converting the extracted subscriber identity into a format of the second network; determining whether to forward the call establishment request to the subscriber; and where it is so determined, converting the call establishment request into a format suitable for the second network, and forwarding the converted call establishment request to the subscriber using the converted identity.

15 Claims, 2 Drawing Sheets

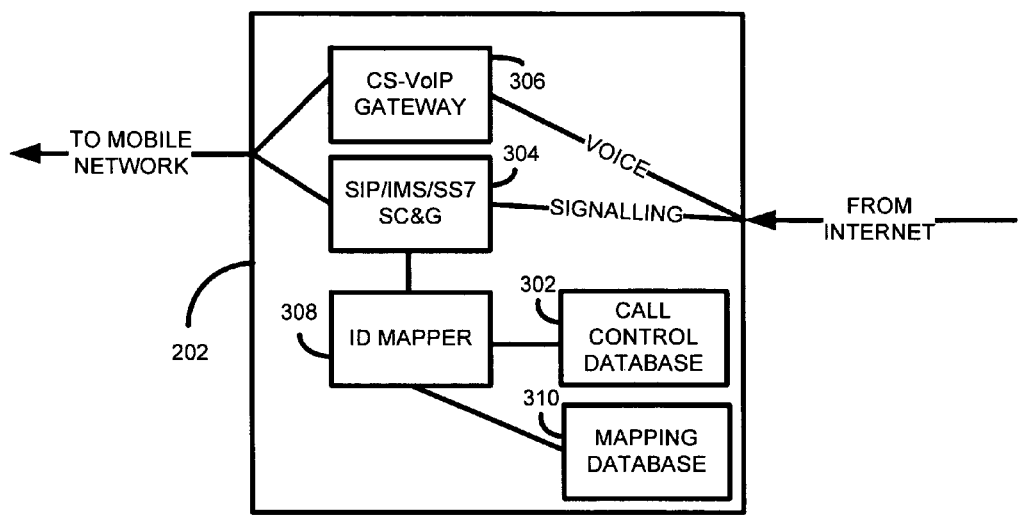
FIGURE 3
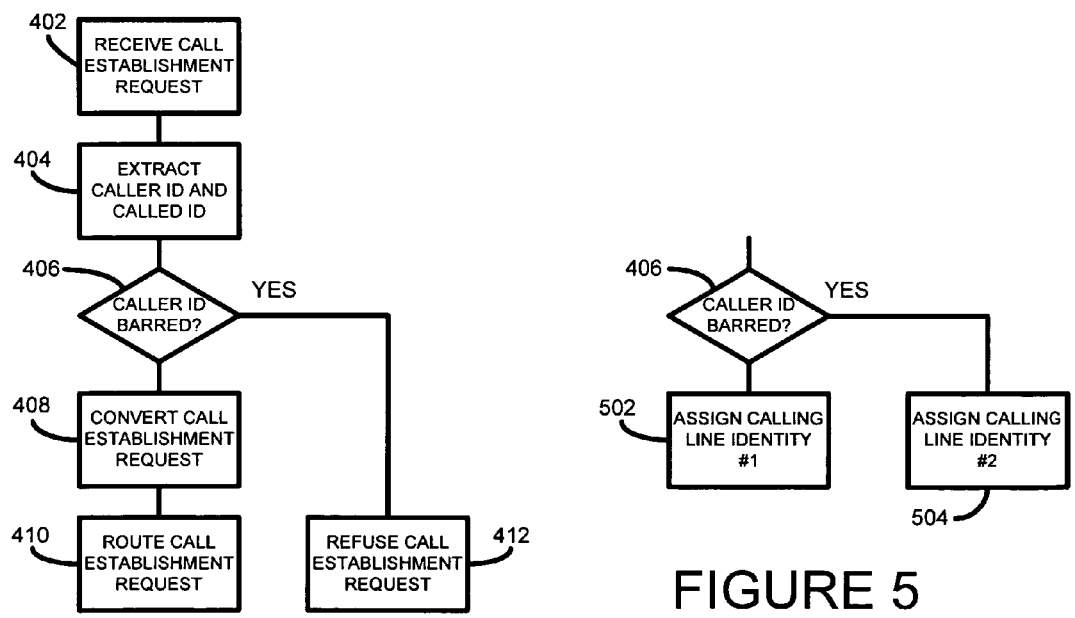
FIGURE 4
FIGURE 5

COMMUNICATIONS SYSTEM AND GATEWAY

The present invention relates generally to the field of telecommunications and, more particularly, to methods and apparatus for use in controlling communications between different types of communication network.

In recent years voice over Internet protocol (VoIP) telephony has become increasingly widespread attracting ever growing numbers of users by offering cheap, and often free, telephone calls worldwide.

Currently one of the most popular VoIP systems is provided by Skype Ltd., although numerous other VoIP systems exist. VoIP systems provide a VoIP client application (hereinafter referred to as a VoIP client) that runs on personal computing devices such as personal computers, personal digital assistants and the like. A VoIP client enables users to place typically free VoIP telephone calls between other users who also have the VoIP client installed on their computing device, providing that both users are connected to the Internet at the same time.

In addition to providing free VoIP telephone calls between VoIP clients, increasing numbers of VoIP services enable VoIP clients to place telephone calls to landline or mobile telephone numbers through use of VoIP gateways connected to an appropriate telephony network. Since destination networks may levy a charge for terminating a VoIP originated call on their network, a VoIP client typically has to have a credit account with the VoIP provider in order to make calls to such destination networks. Any incurred call charges are debited from the user's account. Other charging options may also exist.

In conventional telephony systems it is known to provide network or terminal equipment based call barring systems for preventing calls from given telephone numbers from being connected to a subscriber. This is possible in conventional telephone systems since the calling line identity is transmitted as signalling data and is delivered to a called terminal whenever a call is made.

However, in VoIP systems of the type described above it cannot generally be guaranteed that a VoIP client has a permanently associated telephone number. Typically, whenever a VoIP client is used to make a call to a terminal on a PSTN or mobile telephone network a standard calling line identity (CLI) assigned to the VoIP provider is associated with the call. The effect of this is that all VoIP clients of a given VoIP provider are either allocated the same calling line identity or are allocated a calling line identity from a group of caller IDs associated with the VoIP provider. Accordingly, conventional PSTN and mobile network call barring systems are rendered ineffective since barring a calling line identity associated with the VoIP provider would result in the barring of all calls made through the VoIP provider, barring both nuisance and non-nuisance calls. Evidently, the current situation is somewhat unsatisfactory.

Accordingly, one aim of the present invention is to overcome, or at least alleviate, at least some of the above problems.

According to a first aspect of the present invention, there is provided a method, in a communication gateway, of forwarding a call establishment request from a caller of a first network to a subscriber of a second network. The method comprises receiving from a caller a call establishment request intended for a subscriber, obtaining the identities of the caller and the subscriber, the identities being in a first format of the first network, converting the extracted subscriber identity into a format of the second network, determining whether to forward the call establishment request to the subscriber and, where it is so determined, converting the call establishment request into a format suitable for the second network, and forwarding the converted call establishment request to the subscriber.

Advantageously, this provides called parties the ability to bar calls originating from voice over IP originated networks in a simple and effective manner, even where the caller line identity attributed to a VoIP originated call is not available or is not unique.

Suitably, the step of determining further comprises accessing a data store comprising details of caller and subscriber identities and making the determination based on the extracted and/or converted identities.

Suitably, the step of accessing comprises accessing a data store representing a white or blacklist of approved or barred caller identifications.

Suitably, the first network may be a voice over Internet protocol VoIP type network and the second network may be a public switched telephone type network.

Suitably, the format of an identity in the first network is in the form of a session initiation protocol SIP address, and the format of an identity in the second network is in the form of a telephone subscriber number.

Suitably, the subscriber may be a called-party-pays subscriber.

Suitably, the method may further comprise adding the identity of the caller to the data store in response to the subscriber dialing a predetermined telephone number after having received a call from the caller.

Suitably, the step of forwarding the call establishment request may further comprise assigning a predetermined caller line identifier to the call establishment request based on the determination.

According to a second aspect of the present invention, there is provided a communication gateway operating in accordance with any of the above method steps.

According to a third aspect of the present invention, there is provided a communication system having a communication gateway as described above.

Embodiments of the present invention will now be described, by way of non-limiting example only, with reference to the accompanying drawings, in which:

FIG. 3 is a block diagram showing the gateway 202 of FIG. 2 in greater detail according to one embodiment;

FIG. 4 is a flow diagram outlining example processing steps taken by the gateway according to one embodiment; and FIG. 5 is a flow diagram outlining example processing steps taken by the gateway according to a further embodiment.

Figure 1:
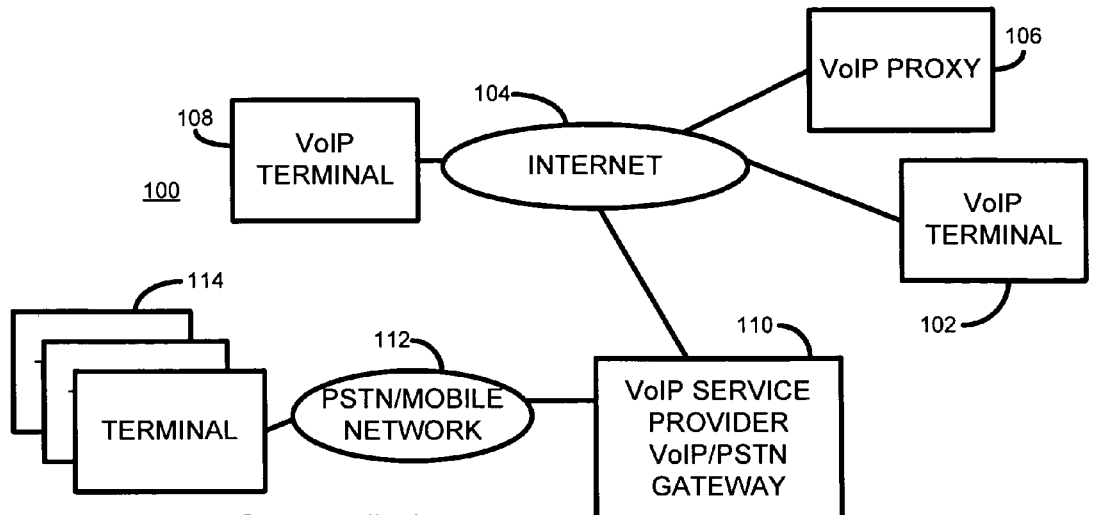
FIG. 1 is a simplified block diagram of a voice over Internet protocol (VoIP) system 100 according to the prior art.

Referring now to FIG. 1, there is a shown a simplified block diagram of a communication system 100 according to the prior art.

A user uses a VoIP terminal 102. The VoIP terminal may be provided by the VoIP provider or a generic VoIP terminal may be used if appropriately configured for use with the VoIP provider's VoIP system. The VoIP terminal 102 may be, for instance, a conventional personal computing device, on which is executed a suitable VoIP client providing access to the VoIP service of the VoIP service provider. Those skilled in the art will appreciate that alternative VoIP terminals could be used, such as a SIP phone or other suitable terminal equipment. Each VoIP terminal has an identifier which is unique within a given VoIP system. The identifier of the terminal may be associated with the terminal itself or may be associated with a user of the terminal, for example by the user identifying himself to the terminal.

The VoIP terminal 102 enables a user to initiate a VoIP call request via the Internet or other Internet protocol or equivalent network 104. A call request may be placed to another VoIP terminal, such as the VoIP terminal 108. A call request to the VoIP terminal 108 may be initiated by supplying the identifier of the destination VoIP terminal 108 to the VoIP terminal 102 in any generally known manner.

The VoIP terminal 102 also enables a user to initiate a VoIP call request, via the network 104, to a terminal 114 on a public switched telephone network (PSTN), mobile telephone or other equivalent network 112. Such a call request may be placed by using the telephone subscriber number associated with that terminal. To enable such VoIP originated calls to access a PSTN or mobile network the VoIP provider provides a VoIP to PSTN/mobile gateway 110. The gateway 110 converts voice and signalling information from VoIP and session initiation protocol (SIP) formats into an appropriate PSTN network format, such as signalling system number 7 (SS7), enabling a VoIP originating call to be terminated by a PSTN or mobile terminal 114.

When the VoIP terminal 102 places a call to the terminal 114 a call establishment request is routed to the gateway 110, via a VoIP proxy 106, for relaying or forwarding on to the PSTN network 112. The gateway converts VoIP signalling messages into those appropriate for the PSTN/mobile network 112 enabling signalling messages to be exchanged between the network 112 and the VoIP system. If the terminal 114 accepts the call establishment request the call is connected in a generally known manner. Once the call is connected voice signals and, as appropriate, signalling data, from the VoIP terminal 102 are transmitted, through the gateway 110 to the terminal 114, and vice-versa, again in a generally known manner for example to enabling a conversation between the two parties to take place.

When a call is connected the VoIP provider is typically charged by the provider of the network 112 for terminating the call. Accordingly, a user of a VoIP terminal wishing to make a call to a terminal 114 is typically required to have a user account with the VoIP provider so that any call termination charges incurred by the VoIP provider can be passed on to the user.

As already mentioned, the calling VoIP terminal 102 has an associated identifier. Typically the identifier is in the form of text string or SIP address, such as "Bob Smith", "sip:bob.smith@hp.com", IP address or the like. PSTN and mobile networks, however, use a different system for identifying subscribers and/or subscriber terminals, and instead typically identify subscribers or subscriber terminals by way of a subscriber telephone number.

PSTN and mobile telephony networks typically require all calls to indicate the identity of the caller using what is commonly referred to as calling line identity (CLI). Calling line identity is used to indicate the telephone subscriber number of the originator of the call. However, since the VoIP terminal has no telephone subscriber number associated therewith, and in order to satisfy the requirements of the PSTN network 112, the gateway 110 allocates a calling line identity when relaying the call onto the network 112.

The calling line identity allocated by the gateway 110 may, for example, be the same calling line identity for all VoIP terminal originated calls, or a caller line identity allocated from a pool of available caller line identities allocated to the VoIP service provider or a predetermined allocated number.

As previously mentioned, under such an arrangement the caller line identity assigned to calls originating from different VoIP terminals are not guaranteed to be unique. This renders conventional call barring systems ineffective at barring calls originating from designated VoIP terminals that have no unique CLI attributed thereto.

A lack of an effective call barring system poses a problem in the integration of VoIP and existing PSTN type networks and leads such systems open to abuse. For example, although any answered nuisance calls will cause the caller to be charged for the call, the introduction of network specific VoIP to PSTN/mobile gateways enables VoIP calls to be terminated directly on the network concerned without incurring any third party call termination charges. Such systems can lead to a significant reduction in call charges, thereby reducing the financial overhead of making nuisance calls.

Furthermore, in mobile and fixed PSTN networks where the called party pays for the call, nuisance calls may be made at no charge to the caller since the receiver of the nuisance call pays for receiving such a call.

The current situation is therefore somewhat unsatisfactory, and may lead to mobile and PSTN network operators delaying the introduction of such gateways.

Embodiments of the present invention, as described in further detail below, however, aim to provide an effective call barring system for VoIP calls originated from VoIP terminals, including those not having a unique CLI associated therewith.

Figure 2:
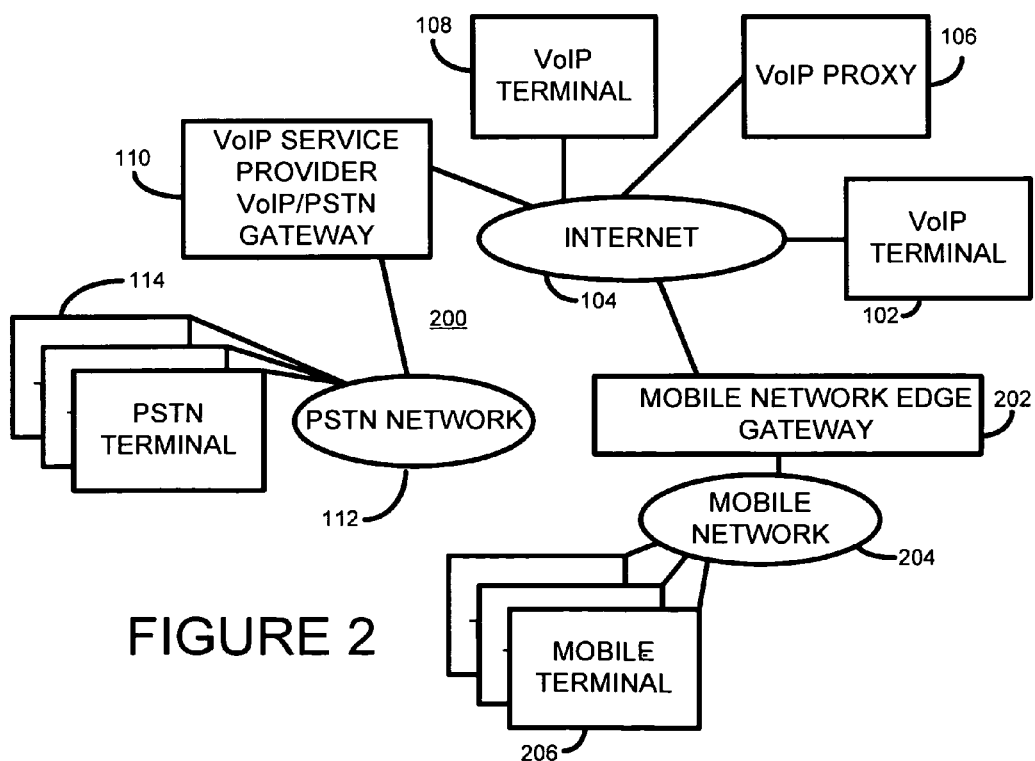
FIG. 2 is a simplified block diagram showing a system 200 according to an embodiment of the present invention.

Referring now to FIG. 2, there is shown a simplified block diagram showing a system 200 according to an embodiment of the present invention. FIG. 2 shows essentially the system 100 of FIG. 1 and additionally shows a mobile network edge gateway 202 according to an embodiment of the present invention, a mobile telephony network 204 and one or more mobile terminals 206.

The mobile edge gateway 202 forms part of the mobile network 204 and, in the present embodiment, is suitably maintained and operated by the mobile network provider. The VoIP proxy 106 is configured to route VoIP terminal originated call establishment requests destined for a mobile terminal 206 on the mobile network 204 via the mobile edge gateway 202. Any call establishment request not destined for a terminal on the mobile network 204 will be relayed, as previously described, to either the VoIP service provider's own VoIP to PSTN gateway 110, or directly to a VoIP terminal, such as the VoIP terminal 108, as appropriate.

A user of a VoIP client may typically place a call to a mobile terminal 206 of subscriber of the mobile network 204 in one of two ways. The first is to supply the telephone subscriber number of the subscriber, for example a telephone number in the form +3312345678, to the VoIP client. Since the supplied telephone number is not in a suitable format of the VoIP system, the VoIP client converts it into a suitable format, for example by converting the supplied telephone number into a SIP address. This may be achieved, for example, by appending thereto suitable SIP nomenclature. For example, the telephone subscriber number +3312345678 may be converted to SIP:+3312345678@voip-provider.com.

Alternatively, the subscriber of the mobile network 204 may already have an SIP address that is mapped to his mobile terminal 206. For example, a user may have a SIP address assigned through the VoIP provider such as SIP:bob-mobilephone@voip-provider.com. In this case the subscriber will preferably have suitably provided to a mapping database, such as the mapping database 310 of FIG. 3, the actual telephone subscriber number of his user terminal, to enable a suitable mapping to take place, as is described further below.

In either case, a call establishment request sent from a VoIP client to the SIP address of the subscriber of the mobile is forwarded, through use of the VoIP proxy 106, to the mobile network edge gateway 202.

Advantageously, the position of the gateway 202 in relation to the mobile network 204 enables, according to the present embodiments, an effective call barring system for VoIP originated calls to be provided, as will now be described below in further detail, with reference to FIG. 3.

FIG. 3 is a block diagram showing the mobile network edge gateway 202 in greater detail. The gateway 202 receives VoIP signalling and voice data from the Internet 104. The VoIP signalling data is sent to a service controller and gateway 304 which converts VoIP signalling data to mobile network signalling data and forwards the converted signalling data to the mobile network 204. Voice data received from the Internet 104 is sent to a circuit-switched to VoIP gateway 306 which converts VoIP voice data into an appropriate circuit-switched format and sends the converted data to the mobile network 204. Data coming from the mobile network 204 is converted in a similar manner.

The operation of the gateway 202 according to one embodiment will now be described with further reference to FIG. 4, which is a flow diagram outlining example processing steps that may be taken by the gateway.

As previously mentioned, the VoIP proxy 106 is configured to route all call establishment requests intended for a mobile terminal 206 on the mobile network 204 to the gateway 202.

When a VoIP call establishment request is received by the gateway (step 402) the request is forwarded to the service control and gateway 304 which extracts, or otherwise obtains (step 404) both the VoIP identifier of the originating VoIP terminal and the SIP address used to identify the called mobile terminal 206. The extracted identifiers are passed to an identity mapping module 308.

If the SIP address of the called mobile terminal 206 is in the form SIP:+3312345678@voip-provider.com the identity mapping module recognises this as containing the actual telephone subscriber number of the called mobile terminal 206. The identity mapping module may therefore simply remove the SIP nomenclature from the SIP address to obtain the telephone subscriber number of the called mobile terminal 206.

If the SIP address of the called mobile terminal 206 is in the form SIP:bob-mobiletelephone@voip-provider.com the identity mapping module resolves the SIP address, using the mapping database 310, to obtain the telephone subscriber number of the mobile terminal 206. Those skilled in the art will appreciate that the resolution of a SIP address to a telephone subscriber could additionally, or alternatively, be performed using elements external to the gateway 202 such as, for example, a SIP registrar server.

The identity mapping module 308 is also responsible, once the telephone subscriber of the mobile terminal 206 has been obtained, for determining (step 406) whether the call establishment requested intended for the mobile terminal 206 can be completed. The determination is made using a call control database 302.

The call control database 302 may be used either as a so-called 'blacklist', that is to store, for each subscriber of the mobile network 204, zero or more VoIP identifiers from which call establishment requests are to be barred, or as a so-called 'white list', that is to store, for each subscriber of the mobile network 204, zero or more VoIP identifiers from which call establishment requests are authorised.

Preferably, the call control database 302 is arranged to store the actual telephone subscriber number of the mobile network subscriber together with any associated white or black listed VoIP client identifiers. Alternatively, however, where the mobile network subscriber has a SIP address mapped to his telephone subscriber number, the call control database 302 may be additionally, or alternatively, be arranged to store the SIP address, such as SIP:bob-mobilephone@voip-provider.com, together with any associated white or black listed VoIP client identifiers.

The call control database 302 may, alternatively, be located remotely from the gateway 202 in which case the gateway 202 provides suitable network means for accessing the database.

If it is determined that the call establishment request can be completed, the gateway 304 converts the call establishment request into a suitable format for the mobile network 204 (step 408) and forwards (step 410) the converted call establishment request onto the mobile network 204.

If it is determined that the call establishment request cannot be completed, and should be barred, the call establishment request is blocked or otherwise refused (step 412), without being forwarded to the called terminal. If the call establishment request is blocked, it may be preferable to cause an audio message to be played to the originating VoIP terminal indicating the VoIP terminal identifier has been blocked. This may be performed, for example, by a suitable interactive voice response (IVR) unit (not shown) either in, or accessible to, the gateway 202.

An further embodiment is described with reference to FIG. 5, which is a flow diagram outlining example processing steps according to a second embodiment. At step 406, if it is determined by the identity mapping module 308 that the called terminal does not wish to block calls from the originating VoIP terminal, the identity mapping module 308 causes the service control and gateway module 304 to assign (step 502) a first predetermined calling line identity to the call. On the other hand, if the call terminal does wish to block calls from the originating VoIP terminal, the identity mapping module 308 causes a second predetermined calling line identity to be assigned (step 504) to the call. In this embodiment, the first predetermined calling line identity may be designated as an 'approved' calling line identity, whereas the second predetermined calling line identity may be designated as a 'to be blocked' calling line identity. In this way the user of the called terminal may use existing terminal or network based call blocking systems to block, for example, all calls having the second predetermined calling line identity.

A subscriber may create an entry in the call barring database 302 in a number of different ways. For example, a subscriber may access a web interface to the database through the Internet 104, and through the web interface may add, delete or otherwise manage VoIP terminal identifiers which are to be barred. One of the problems with this approach, however, is that the subscriber has to know the VoIP identifier of the terminal they wish to bar. For example, a caller may not know, and may not have any way of finding out, the VoIP terminal identifier of a nuisance or other caller they wish to block.

The mobile network 204, therefore, preferably provides a suitable voice application to enable a subscriber to manage the contents of the database 302 associated with the subscriber. For example, such a voice application may enable a subscriber to obtain the VoIP terminal identifier of the last VoIP originated call made to the subscriber, and to add that identifier to the database. Such a voice application may, for example, be accessed simply by calling a predetermined telephone subscriber of the voice application after having received a call from a VoIP terminal they wish to bar. This may be achieved, for example, since the mobile network 204, through the gateway 202, has access to appropriate call records and is then able to determine the VoIP identifier of the last VoIP caller.

The invention claimed is:

1. A method, in a communication gateway, of forwarding a call establishment request from a caller of a first network to a subscriber of a second network, comprising:
   receiving from a caller a call establishment request intended for a subscriber;
   obtaining the identities of the caller and the subscriber, the identities being in a format of the first network;
   converting the obtained subscriber identity into a format of the second network;
   determining whether to forward the call establishment request to the subscriber; and
   where it is so determined, converting the call establishment request into a format suitable for the second network, and forwarding the converted call establishment request to the subscriber using the converted identity.

2. The method of claim 1, wherein the step of determining further comprises accessing a data store comprising details of caller and subscriber identities and making the determination based on the extracted and/or converted identities.

3. The method of claim 2, wherein the step of accessing comprises accessing a data store representing a white or blacklist of approved or barred caller identifications.

4. The method of claim 1, wherein the first network is a voice over Internet protocol VoIP type network and wherein the second network is a public switched telephone type network.

5. The method of claim 1, wherein the format of the first network is in the form of a session initiation protocol SIP address, and wherein the format of the second network is in the form of a telephone subscriber number.

6. The method of claim 1, wherein the subscriber is a called-party-pays subscriber.

7. The method of claim 1, further comprising adding the identity of the caller to the data store in response to the subscriber dialing a predetermined telephone number after having received a call from the caller.

8. The method of claim 1, the step of forwarding the call establishment request further comprising assigning a predetermined caller line identifier to the call establishment request based on the determination.

9. A communication system comprising hardware to receive from a caller a call establishment request intended for a subscriber, to obtain signalling data, including identities of the caller and the subscriber in a format of a first network, to convert the signaling data into a format of a second network, to determine whether to forward the call establishment request to the subscriber, and
   where it is so determined, to forward the call establishment request, including the signalling data converted to the format of the second network, to a subscriber terminal in the second network to establish a call using the converted identity of the subscriber.

10. The communication system of claim 9 comprising a communication gateway.

11. A network gateway comprising:
   a service controller including hardware
      to receive from a caller a call establishment request intended for a subscriber,
      to obtain signalling data, including identities of the caller and the subscriber in a format of a first network,
      to convert the signaling data into a format of a second network,
      to determine whether to forward the call establishment request to the subscriber, and
      where it is so determined, to forward the call establishment request, including the signalling data converted to the format of the second network, to a subscriber terminal in the second network to establish a call using the converted identity of the subscriber.

12. The network gateway of claim 11, wherein the service controller is to access a data store comprising details of the caller and the subscriber to convert the signalling data to the format of the second network.

13. The network gateway of claim 12, wherein the service controller is to access a white or blacklist of approved or barred caller identifications in the data store to convert the signalling data to the format of the second network.

14. The network gateway of claim 11, wherein the first network is a voice over Internet protocol (VoIP) type network and wherein the second network is a public switched telephone type network.

15. The network gateway of claim 11, wherein the format of the first network is in the form of a session initiation protocol SIP address, and wherein the format of the second network is in the form of a telephone subscriber number.

* * * * *